United States Patent
Mazuir et al.

(10) Patent No.: US 10,286,839 B1
(45) Date of Patent: May 14, 2019

(54) INTERIOR LIGHTING SYSTEM HAVING WINDOW WITH BAND PASS FILTER COORDINATED WITH BROAD/NARROW BAND LIGHT SOURCE TO PROVIDE PRIVACY MODE

(71) Applicant: Apple Inc., Cupertino, CA (US)

(72) Inventors: Clarisse Mazuir, San Jose, CA (US); David E. Kingman, Campbell, CA (US); Martin Melcher, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 31 days.

(21) Appl. No.: 15/651,805

(22) Filed: Jul. 17, 2017

Related U.S. Application Data (60) Provisional application No. 62/384,830, filed on Sep. 8, 2016.

(51) Int. Cl.
| | |
|---|---|
| *F21V 11/00* | (2015.01) |
| *B60Q 3/208* | (2017.01) |
| *F21V 9/08* | (2018.01) |
| *F21V 8/00* | (2006.01) |
| *G02F 1/137* | (2006.01) |
| *B60Q 3/64* | (2017.01) |
| *B60Q 3/74* | (2017.01) |
| *E06B 9/24* | (2006.01) |
| *F21Y 115/10* | (2016.01) |
| *F21Y 113/13* | (2016.01) |

(52) U.S. Cl.
CPC .............. *B60Q 3/208* (2017.02); *B60Q 3/64* (2017.02); *B60Q 3/74* (2017.02); *E06B 9/24* (2013.01); *F21V 9/08* (2013.01); *G02B 6/0035* (2013.01); *G02B 6/0055* (2013.01); *G02B 6/0068* (2013.01); *G02B 6/0073* (2013.01); *G02F 1/13725* (2013.01); *E06B 2009/247* (2013.01); *E06B 2009/2417* (2013.01); *E06B 2009/2464* (2013.01); *F21Y 2113/13* (2016.08); *F21Y 2115/10* (2016.08); *G02F 2203/48* (2013.01)

(58) Field of Classification Search
CPC ... F21V 11/00; F21V 9/20; F21V 9/40; F21V 9/45; F21V 23/04; F21V 9/00; B60Q 3/60; B60Q 3/70; B60Q 3/74
USPC ................................. 362/276, 293; 359/609
See application file for complete search history.

(56) References Cited

U.S. PATENT DOCUMENTS

| | | | |
|---|---|---|---|
| 5,009,044 A | * | 4/1991 | Baughman ............ E06B 3/6722 349/16 |
| 6,373,618 B1 | | 4/2002 | Agrawal et al. |
| 6,550,949 B1 | | 4/2003 | Bauer et al. |
| 6,897,936 B1 | | 5/2005 | Li et al. |

(Continued)

*Primary Examiner* — Ismael Negron
(74) *Attorney, Agent, or Firm* — Treyz Law Group, P.C.; G. Victor Treyz; Michael H. Lyons (57) ABSTRACT

A system includes a space with at least one window separating an interior space from an exterior space; band-pass filter layers provided in the window and configured to block narrowband light; and a light source provided in the interior space and including at least red, green and blue light emitting diodes. The light source is configured to selectively provide broad spectrum white light and narrowband light blocked by the filter layers in the window, such that the interior space is visible from the exterior space through the window when illuminated by the broad spectrum light, but not visible when illuminated by the narrowband light.

23 Claims, 7 Drawing Sheets

(56) References Cited

U.S. PATENT DOCUMENTS

| | | | |
|---|---|---|---|
| 7,356,969 B1* | 4/2008 | Yurth | E06B 9/24 |
| | | | 359/614 |
| 7,893,890 B2 | 2/2011 | Kelly et al. | |
| 8,576,473 B2* | 11/2013 | Shim | C03C 17/06 |
| | | | 359/288 |
| 9,415,745 B1* | 8/2016 | Clemen, Jr. | B60R 22/00 |
| 9,970,631 B2* | 5/2018 | Wu | F21V 14/003 |
| 2003/0210355 A1* | 11/2003 | Dao | G02F 1/13318 |
| | | | 349/16 |
| 2005/0068629 A1 | 3/2005 | Fernando et al. | |
| 2010/0177025 A1 | 7/2010 | Nagata et al. | |
| 2011/0102878 A1 | 5/2011 | McCarthy et al. | |
| 2011/0235361 A1* | 9/2011 | Sanchezramos | B60Q 3/53 |
| | | | 362/555 |
| 2012/0043888 A1* | 2/2012 | Salter | B60Q 3/54 |
| | | | 315/77 |
| 2013/0188351 A1* | 7/2013 | Schmid | B60K 37/02 |
| | | | 362/235 |

* cited by examiner

INTERIOR LIGHTING SYSTEM HAVING WINDOW WITH BAND PASS FILTER COORDINATED WITH BROAD/NARROW BAND LIGHT SOURCE TO PROVIDE PRIVACY MODE

This application claims the benefit of provisional patent application No. 62/384,830, filed on Sep. 8, 2016, which is hereby incorporated by reference herein in its entirety.

FIELD

This relates generally to systems with windows and interior light sources and, more particularly, to systems such as vehicle systems and building systems with windows and interior light sources.

BACKGROUND

Vehicles and buildings are generally provided with windows. In some situations, it is desirable to provide occupants of vehicles and buildings with privacy using shades, frosted window coatings, or mirror coatings. Arrangements such as these may help prevent observers who are located outside of a window from viewing the activities of someone located inside of the window.

It can be challenging to incorporate structures that enhance privacy into vehicles and buildings. If care is not taken, the ability of a vehicle or building occupant to see through a window may be adversely affected or the aesthetics of the window may be compromised.

SUMMARY

A system such as a vehicle may have windows. The windows may be mounted in a vehicle body or other support structure that surrounds an interior region. The windows and support structure may separate the interior region from an exterior region. The interior region may have a display that may be viewed by vehicle occupants. The interior region may also have interior lighting that illuminates the interior region for the vehicle occupants.

To provide privacy to vehicle occupants in the interior region from observers in the exterior region, the windows may include filter layers. A filter layer for a window may have a visible light transmission spectrum that is characterized by visible light stop bands such as red, green, and blue stop bands. The light source in the interior may have a broad spectrum white light-emitting diode to provide broad spectrum white light illumination over the visible light spectrum during normal operation. When it is desired to operate in a privacy mode in which exterior observers cannot readily view the interior, illumination for the interior may be generated by combining narrowband light from red, green, and blue light-emitting diodes while turning off the broad spectrum white light-emitting diode. The narrowband light may be blocked by the stop bands and thereby prevented from passing through the windows.

If desired, displays in the interior may produce narrowband light that is blocked by the stop bands. The displays may have narrowband light-emitting diodes in a display backlight that are used to provide a liquid crystal display pixel array or other pixel array with backlight illumination, may have an array of narrowband crystalline light-emitting diode dies that emit narrowband light, or may have other configurations that emit narrowband display light.

Filters for the windows may be formed from thin-film interference layers or may be formed from light-absorbing filter layers based on dyes or other light-absorbing substances.

DETAILED DESCRIPTION

A vehicle, building, or other system may have windows. Light sources may be located in interior portions of a vehicle, building, or other system. For example, a vehicle or a conference room in a building may have interior ambient lighting. Displays may also be located in the interior of a vehicle or building. To enhance privacy for the occupants of a vehicle, building, or other system, the windows and the light sources may be configured to operate in both a normal mode in which a display or interior light operates with a normal broad spectrum of white light or a narrowband privacy mode in which a display or interior light operates with a restricted spectrum of light that is blocked by light filters in the windows. Configurations in which the amount of light filtering provided by the light filters in the windows may be adjusted may also be used.

Figure 1:
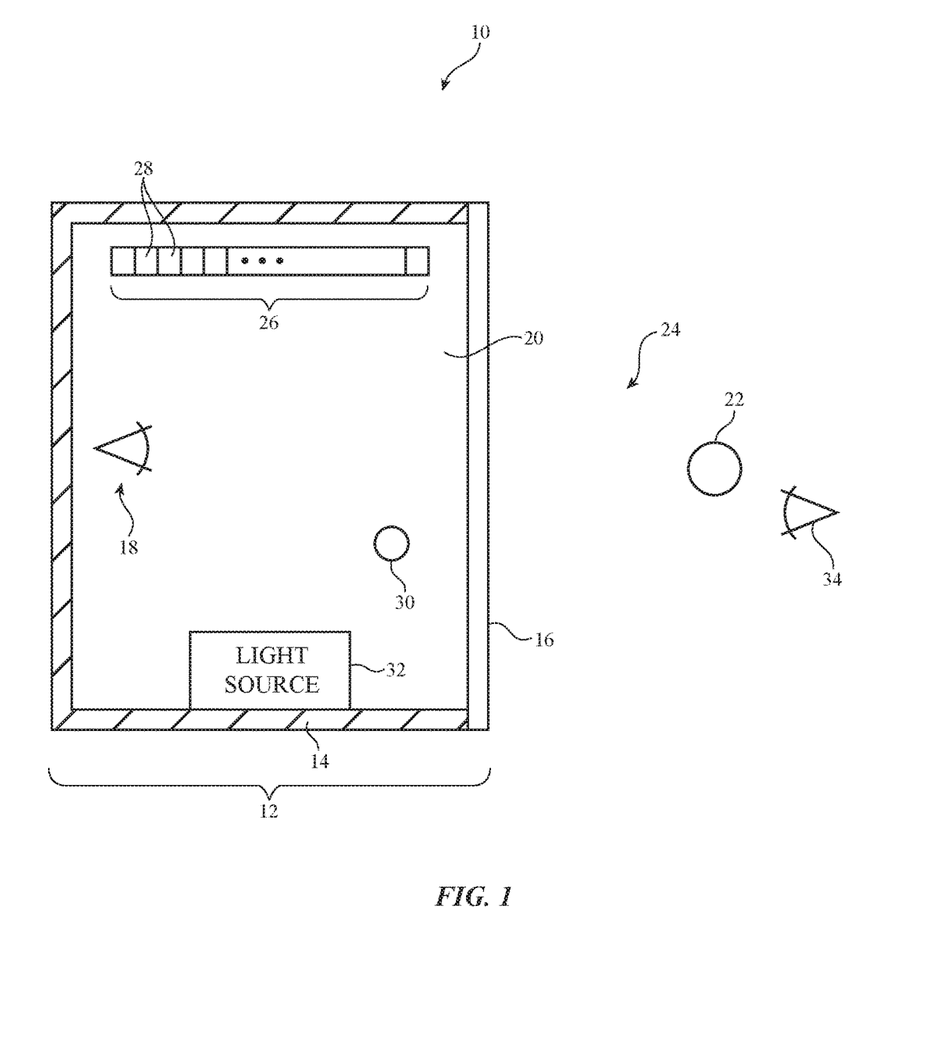
FIG. 1 is a diagram of an illustrative system with a window in accordance with an embodiment.

An illustrative system with windows is shown in FIG. 1. System 10 may have structural portions such as support structure 14 and windows such as window 16 that are mounted in structure 14. In configurations in which system 10 is a building (or a room in a building), structure 14 may form building walls. In configurations in which system 10 is a vehicle, structure 14 may include vehicle doors and other portions of a vehicle body (e.g., structure 14 may be a vehicle body formed from metal and/or plastic structural members, etc.).

There may be one or more windows 16 mounted in structure 14. Configurations in which one window 16 is mounted in structure 14 may sometimes be described herein as an example. This is merely illustrative. System 10 may, in general, include any suitable number of windows 16.

Window 16 and structure 14 may fully or partially enclose an interior region such as interior 20 and may separate interior 20 from an exterior region such as exterior 24. An occupant of interior 20 such as occupant 18 may view display 26 and interior objects such as object 30 that are illuminated by interior illumination from interior light source 32. Occupant 18 may also view objects such as external object 22 in exterior 24 through window 16. Display 26 may have a pixel array formed from rows and columns of pixels 28. There may be any suitable number of displays such as display 26 in interior 20 (e.g., one or more, two or more, etc.). Display 26 may be mounted to structures in interior 20 (e.g., structure 14) or may form part of a stand-alone device such as a laptop computer, cellular telephone, tablet computer, wristwatch device, or other portable electronic device in interior 20. There may also be any suitable number of interior light sources such as interior light source 32 in interior 20 (e.g., one or more, two or more, etc.). Interior light source 32 may be based on light-emitting diodes or other sources of light and may be used to provide interior illumination to interior 20 in conditions in which relatively little daylight or other exterior light enters interior 20 through window 16 from exterior 24 or in conditions in which it is desired to supplement light entering interior 20 from exterior 24 through window 16.

To provide occupant 18 with privacy, it may be desirable to provide window 16 with a partially reflective mirror. Window 16 may, for example, have a partially reflective mirror that is sufficiently transparent to allow occupant 18 to view exterior objects such as object 22 through window 16 while creating reflections for external viewers such as external viewer 34 that make it difficult for external viewer 34 to view occupant 18, display 26, and other aspects of interior 20 through window 16. In dim exterior lighting conditions or in conditions in which the reflectivity of the mirror is low or the mirror is omitted, reflections from the exterior of window 16 may be reduced in intensity, which raises the risk that external viewer 34 will be able to see into interior 20.

To help enhance privacy for occupant 18 in conditions such as these, sources of interior light such as interior ambient light source 32 and display 26 may be configured to operate in different modes such as a normal operating mode and a narrowband privacy mode.

During normal operation, light sources in interior 20 may generate output light with a normal broad spectrum. For example, light source 14 may generate broad spectrum white light using white light-emitting diodes and display 26 may provide pixels 28 with broadband backlight illumination. In this normal operating mode, the illumination provided by light source 32 may be pleasing to the eyes of occupant 18 and the output of display 26 will have a desirable appearance.

During the narrowband privacy mode, the output spectrum of the illumination produced by light source 32 and display 26 may be restricted to a few specific narrow wavelength bands. As an example, light source 32 or a backlight or other structures in display 26 may produce light using narrowband red, green, and blue light-emitting diodes or narrowband light-emitting diodes of other colors (as an example). If desired, light source 32 may include an incandescent lamp, fluorescent lamp, halogen lamp, and/or other broad band light-emitting device that emits broadband light (white light) that is filtered by narrowband filters in source 32 to produce narrowband red, green, and blue light (or other narrowband light). Configurations in which light source 32 has narrowband light-emitting diodes may sometimes be described herein as an example. This is, however, merely illustrative. Light source 32 may supply narrowband light using a white light source and red, green, and blue narrowband bandpass dichroic filters or any other suitable light emitting and/or light filtering structures.

In an illustrative configuration in which light source 32 includes red, green, and blue narrowband light-emitting diodes, the output of the red, green, and blue light-emitting diodes may be balanced to provide interior 20 with white (or near-white) illumination or illumination with a desired non-white color cast. Window 16 may be provided with a light filter having stop bands that are aligned respectively with the red, green, and blue output wavelengths of the red, green, and blue light-emitting diodes. This prevents interior light from light source 32 (and/or display 26 in configurations in which display 26 has been configured to emit red, green, and blue narrowband light) from passing through window 16 and exiting interior 20 to exterior 24. Because the interior light generated during the narrowband privacy mode is still satisfactory for use by occupant 18, occupant 18 may be provided with satisfactory interior illumination and displayed images on display 26. At the same time, external observer 34 will not be able to view objects in interior 20 that are illuminated by light source 32 and will not be able to view images displayed on display 26 because the narrowband interior light will not pass through window 16.

Window 16 may be a front, side, rear, or sunroof window in a vehicle, may be a conference room window or other window in the inside of a building, may be a window in an exterior wall of a building, or may be any other suitable type of window. Window 16 may be formed from one or more layers of transparent glass, clear polymer (e.g., polycarbonate), polymer adhesive layers, and/or other layers. In some arrangements, window 16 may include laminated window structures such as one or more layers of glass with interposed polymer layer(s). The polymer in a laminated window may be, for example, a polymer such as polyvinyl butyral (PVB) or ethylene-vinyl acetate (EVA). A wavelength-selective filter for window 16 may be formed on one or more surfaces of the layers of transparent glass or other transparent substrate material in window 16 and/or may be formed on a plastic film or other substrate. A wavelength-selective filter and/or other structures for window 16 (e.g., layers providing fixed and/or adjustable amounts of tint, haze, reflectivity, and/or wavelength-selective filtering) may be embedded within the polymer in a laminated window (e.g., in a polymer layer such as a PVB or EVA layer that is interposed between outer and inner glass layers), may be formed on the inner and/or outer surfaces of structural window layers (e.g., glass or plastic layers), etc.

Figure 2:
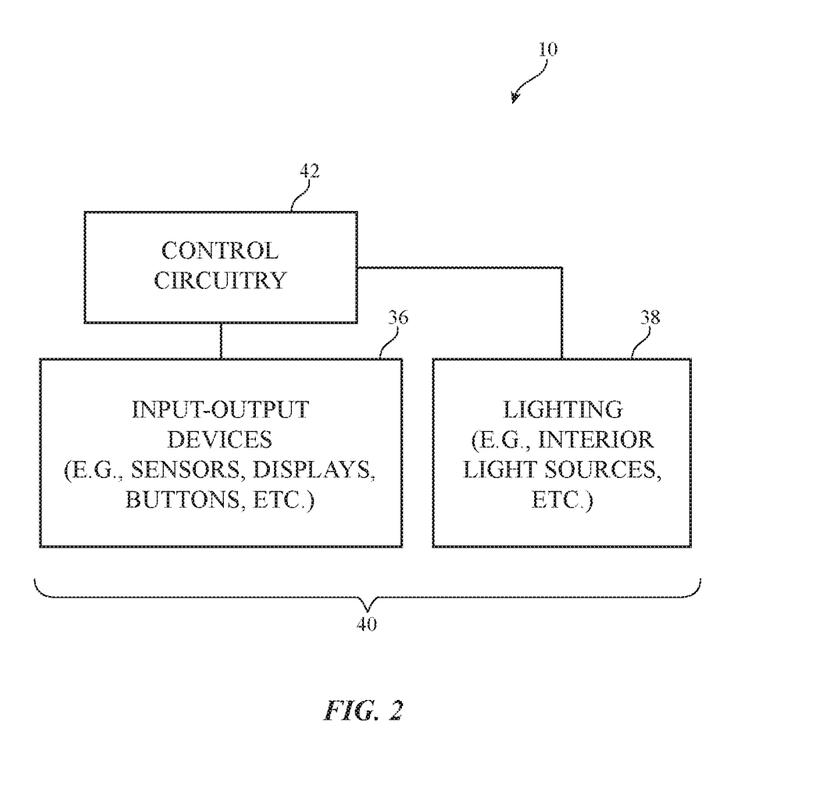
FIG. 2 is a schematic diagram of a system such as the system of FIG. 1 in accordance with an embodiment.

A schematic diagram showing illustrative components that may be used in system 10 is shown in FIG. 2. As shown in FIG. 2, system 10 may include control circuitry 42 and input-output circuitry 40. Control circuitry 42 may include storage and processing circuitry for supporting the operation of system 10. The storage and processing circuitry may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 42 may be used to control the operation of system 10 and the components in system 10. The processing circuitry may be based on one or more microprocessors, microcontrollers, digital signal processors, baseband processors, power management units, audio chips, application specific integrated circuits, etc.

The components of system 10 that are controlled by control circuitry 42 may include input-output circuitry 40. Input-output circuitry 40 may include input-output devices such as input-output devices 36 and lighting 38. Input-output devices 36 may include sensors (e.g., force sensors, touch sensors, temperature sensors, magnetic sensors, gas sensors, humidity sensors, pressure sensors, ambient light sensors, proximity sensors, and/or other sensors), may include buttons, touch sensors on displays, touch pads, keyboards, displays such as display 26 (FIG. 1), and/or other input-output devices (audio components, etc.). If desired, input-output devices 36 may include adjustable filters and/or adjustable layers in window 16 (e.g., layers that provide window 16 with adjustable wavelength-dependent filtering, adjustable tint, adjustable haze, adjustable reflectivity, and/or other adjustable and/or fixed properties). Lighting 38 may include exterior lights and interior lighting such as interior light source 32.

Figure 3:
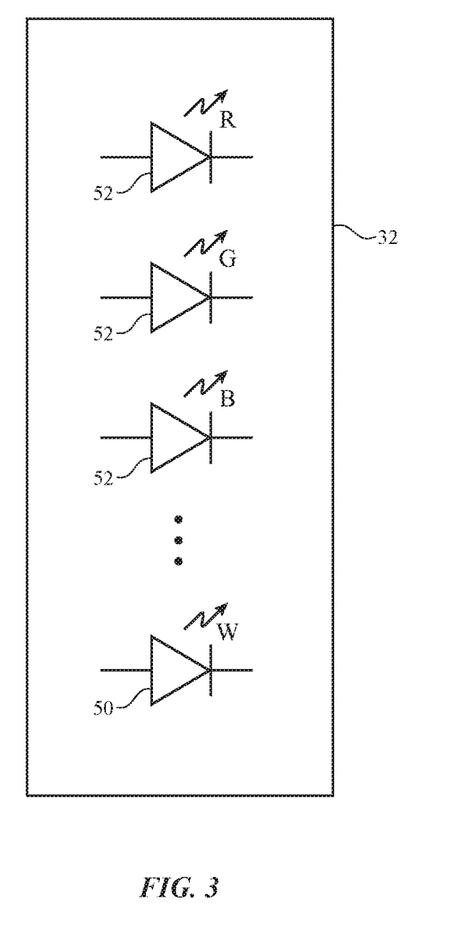
FIG. 3 is a diagram of an illustrative interior light source in accordance with an embodiment.

FIG. 3 is a schematic diagram of an illustrative interior light source. As shown in FIG. 3, interior light source 32 may include broadband light sources such as white light-emitting diode(s) 50 and narrowband light sources such as red, green, and blue light-emitting diodes 52. White light-emitting diodes such as white light-emitting diode 50 may include a light-emitting diode that creates light at a pump wavelength such as a blue wavelength. The blue light from this light-emitting diode may be applied to a photoluminescent material. For example, white light-emitting diode 50 may include a phosphor such as a YAG phosphor that has been doped with one or more dopants, so that white light-emitting diode 50 produces broadband white light (light covering most or all of the visible light spectrum). If desired, light source 32 may include other types of broadband light emitters such as incandescent lamps or other lamps (non-light-emitting diode white light sources) that produce white light. Configurations in which light source 32 includes a white light source such as a white light-emitting diode may sometimes be described herein as an example. This is merely illustrative. If desired, other types of white light source (incandescent white light sources, etc.) may be used to form white light source 50.

Narrowband light-emitting diodes 52 of light source 32 may each produce light of a single color over a relatively narrow range of wavelengths (e.g., over a 1-10 nm full width half maximum wavelength range). In the example of FIG. 3, there are three narrowband light-emitting diodes 52, producing respectively red light R, green light G, and blue light B. There may, in general, be two or more, three or more, four or more, 3-6, more than five, fewer than six, or other suitable number of different narrowband light-emitting diodes 52 in light source 32. The configuration of FIG. 3 in which there are three narrowband light-emitting diodes 52 (red, green, and blue light-emitting diodes 52) is merely illustrative. The intensity of light produced by light source 32 may be sufficient to allow occupant 18 to comfortably read a book at night or perform other tasks requiring ambient lighting in interior 20.

Figure 4:
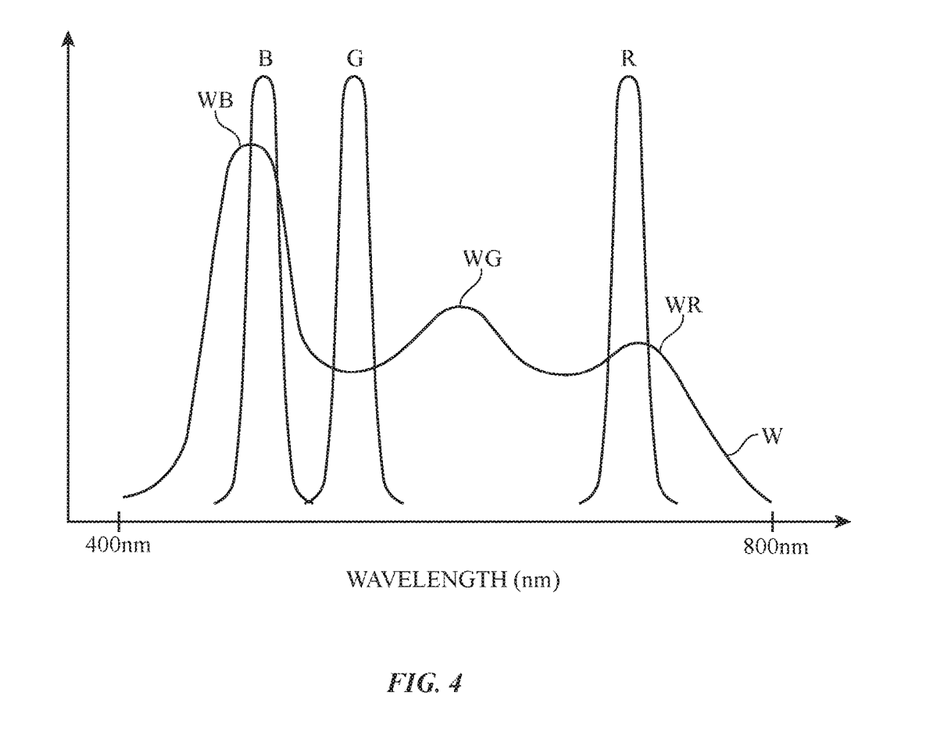
FIG. 4 is a graph showing how the spectrum of interior lighting may be adjusted dynamically to support operations in a normal (non-privacy) mode and a privacy mode in accordance with an embodiment.

Illustrative light output spectra for the light-emitting diodes of FIG. 3 are shown in the graph of FIG. 4.

Curve W of FIG. 4 corresponds to the white light output from an illustrative white light-emitting diode 50. In the example of FIG. 4, diode 50 contains a blue light-emitting diode producing blue light at peak WB and contains a YAG phosphor with dopants that produce light at respective wavelengths such as green wavelengths WG and red wavelengths WR in response to stimulation from the blue light at wavelengths WB.

The use of a YAG phosphor in diode 50 is merely illustrative. Any suitable photoluminescent material may be stimulated by blue light-emitting diode output light or other suitable stimulating light in diode 50 to produce broad spectrum white light. The light from white light-emitting diode 50 (curve W) in FIG. 4 covers the visible light spectrum between 400 and 700 nm. Because the spectrum of white light W extends over 100s of nm, white light W and light-emitting diode 50 are sometimes referred to as being broad spectrum or broadband.

Light-emitting diodes without phosphorescent materials (e.g., narrowband light-emitting diodes 52 of FIG. 3) may produce narrowband output. As shown in the illustrative configuration of FIG. 4, for example, narrowband light-emitting diodes 52 of FIG. 3 may produce narrow peaks such as the peaks associated with blue light B, green light G, and red light R. The wavelength range (e.g., the full-width-half-maximum range) covered by blue light B from blue light-emitting diode 52 may be 2-25 nm, 10-20 nm, may be more than 5 nm, more than 10 nm, more than 15 nm, less than 25 nm, less than 20 nm, or other suitable wavelength range. The full-width-half-maximum bandwidth of the red and green light may also be 2-25 nm, 10-20 nm, may be more than 5 nm, more than 10 nm, more than 15 nm, less than 25 nm, less than 20 nm, or other suitable wavelength range. When combined and used together as interior illumination for interior 20, blue light B, green light G, and red light R of diodes 52 may have a white appearance similar to that of white light W.

Figure 5:
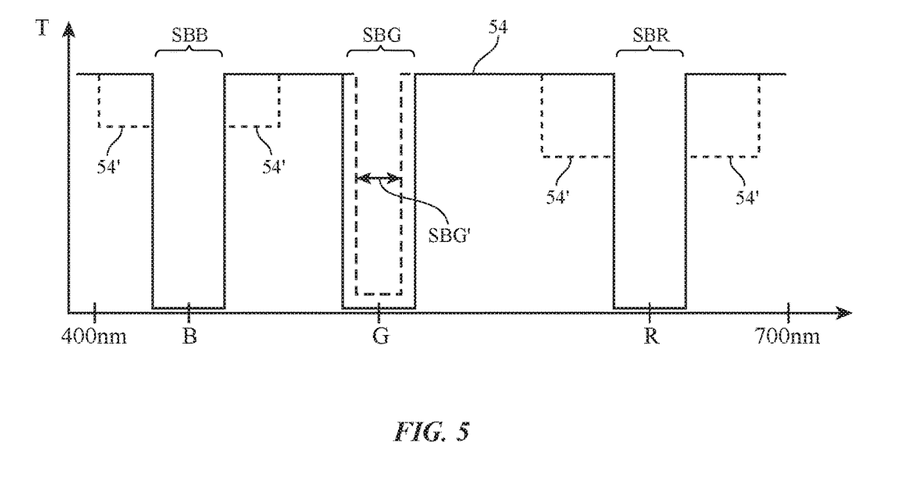
FIG. 5 is graph showing illustrative transmission spectra for a window with a light filter in accordance with an embodiment.

Window 16 may be characterized by a light transmission spectrum having stop bands (light-blocking wavelength ranges) that are aligned with and that cover the narrowband peaks of light-emitting diodes 52. Consider, as an example, illustrative visible light transmission spectrum 54 of window 16 in FIG. 5. As shown in FIG. 5, light transmission T through window 16 may vary as a function of wavelength k. Overall transmission for window 16 at the visible light wavelengths between 400 nm and 700 nm may be high (e.g., above 50%, above 80%, above 95%, above 99%, etc.). In the stop bands of transmission spectrum 54, light transmission may be low (e.g., below 50%, below 20%, below 5%, below 1%, etc.) to block light from light-emitting diodes 52 during privacy mode operations.

As shown in FIG. 5, transmission spectrum 54 may include a blue stop band SBB that is aligned with blue light B from the blue narrowband light-emitting diode 52, a green stop band SBG that is aligned with green light G from the green narrowband light-emitting diode 52, and a red stop band SBR that is aligned with red light R from the red narrowband light-emitting diode 52. Stop bands SBB, SBG, and SBR overlap the respective wavelengths associated with blue light B, green light G, and red light R from light-emitting diodes 52 and thereby prevent the blue, green, and red light from light-emitting diodes 52 from passing through window 16. The stop bands may be formed by incorporating a thin-film interference filter into window 16 and/or by incorporating other light filter structures into window 16 (e.g., a filter layer based on light-absorbing materials such as dyes).

The bandwidth of each stop band may be sufficient to block most or all of the associated light from diodes 52 while being sufficiently narrow to avoid blocking more white light from diode 50 than desired. As an example, the bandwidth of each stop band may (at full width half maximum) be 5-25 nm, 10-20 nm, more than 10 nm, less than 30 nm, etc. The bandwidth of one or more of the stop bands may be adjusted to avoid creating undesired color casts in window 16. As an example, to avoid blocking more green light in white light W from diode 50 than desired, the stop band of the filter in window 16 may be narrowed relative to other bands (e.g., to be less than 25 nm, less than 20 nm, less than 15 nm, less than 10 nm, more than 2 nm, or other suitable wavelength), as illustrated by modified green stop band SBG' of FIG. 5. Color cast adjustments may also be made by modifying the light transmission in other stop bands, adjacent to other stop bands, and/or at other wavelengths. As an example, transmission spectrum 54 may be configured to exhibit a local decrease in transmission at wavelengths that are adjacent to one or more of the stop bands, as illustrated by curves 54'. Adjustments to the transmission spectrum of window 16 may be used to provide window 16 with a neutral color cast (e.g., no apparent coloration) or to provide window 16 with a desired color (e.g., a bluish color cast, a yellowish color cast, etc.).

If desired, display 26 may be configured to always produce light at narrowband wavelengths R, G, and B that are blocked by the stop bands in window 16 or may be configured to operate in a first mode (a normal mode) in which some or most of the light from display 26 falls outside of the stop bands of window 16 and is therefore not blocked by window 16 and a second mode (a privacy mode) in which the stop bands in window 16 block the light from display 26.

Figure 6:
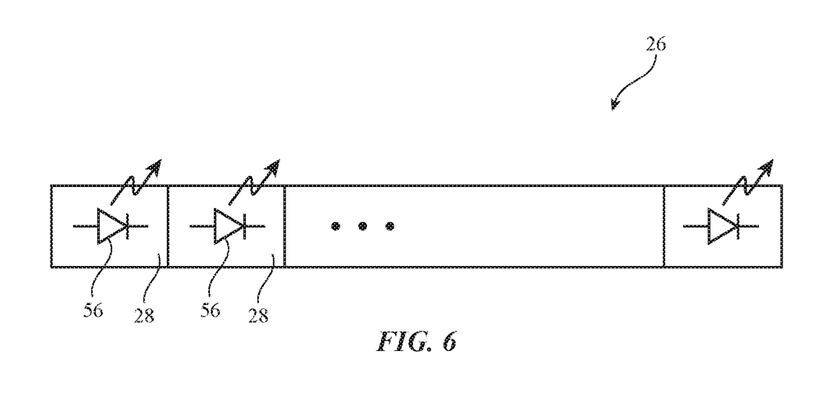
FIG. 6 is a side view of an illustrative display having a pixel array with light-emitting diodes in accordance with an embodiment.

An illustrative configuration for display 26 is shown in FIG. 6. In the example of FIG. 6, display 26 has an array of pixels 28 each of which contains a respective light-emitting diode 56 (e.g., a narrowband crystalline semiconductor light-emitting diode die or a thin-film light-emitting diode). Light-emitting diodes 56 (e.g., narrowband crystalline semiconductor light-emitting diode dies) may be selected to have wavelengths corresponding to the R, G, and B wavelengths of FIG. 5 (i.e., wavelengths that are aligned with stop bands SBB, SBG, and SBR). In this type of configuration, the light produced by display 26 will not pass through window 16. This provides occupant 18 with privacy, because the content on display 26 that is being viewed by occupant 18 will not be visible to external observer 34.

Figure 7:
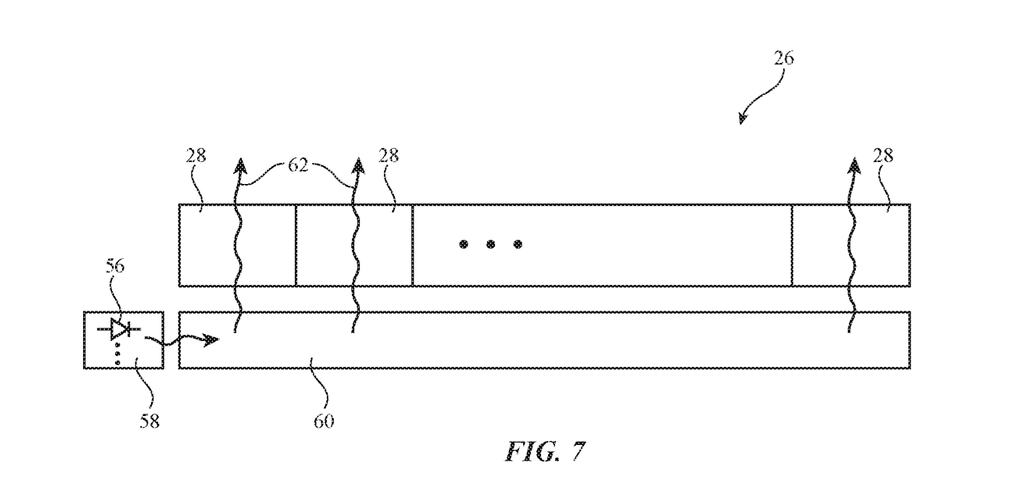
FIG. 7 is a side view of an illustrative backlit display in accordance with an embodiment.

Another illustrative configuration for display 26 is shown in FIG. 6. In the example of FIG. 7, display 26 has an array of pixels 28 that receives backlight illumination 62 from a backlight (backlight unit). The pixel array of display 26 of FIG. 6 may be, as an example, a liquid crystal display. The backlight of the pixel array of display 26 may have a light source such as light source 58. Light source 58 may have an array of light-emitting diodes (e.g., one or more strips of light-emitting diodes 56 that run along one or more of the edges of light guide layer 60). Light from light source 58 may be emitted into one or more of the edges of light guide layer 60 and may propagate within light guide layer 60 in accordance with the principle of total internal reflection. Light scattering features on light guide layer 60 and a reflector layer under light guide layer 60 may cause backlight illumination 62 to be directed outwardly from the backlight through the array of pixels 28.

Light-emitting diodes 56 of light source 58 may be narrowband light-emitting diodes such as the red, green, and blue diodes 52 of light source 32 (FIG. 3). In this type of configuration, backlight 62 will be blocked by the stop bands of the light filter in window 16. If desired, light source 58 may also have broad spectrum white light-emitting diodes. In this type of arrangement, display 26 may be operated in a narrowband privacy mode or a normal (non-private) mode. In the normal mode, broad spectrum white light from the white light-emitting diode may pass through color filter elements in pixels 28. The color filter elements may provide display 26 with the ability to display color images using white backlight. Each color filter element may have a relatively broad wavelength range (e.g., a full width half maximum bandwidth of more than 30 nm, more than 50 nm, more than 70 nm, more than 100 nm, etc.). These wavelength ranges are sufficiently broad that some of the white light that is colored by passing through these color filter elements may not be blocked by the stop bands of window 16, so the content of display 26 may be viewed through window 16. In the privacy mode, narrowband red, green, and blue diodes 56 may be used to provide backlight illumination 62, which will be blocked by the respective stop bands of window 16. In general, any suitable fixed or adjustable backlight that provides narrowband backlight illumination 62 may be used to provide a user with fixed or dynamically selected privacy (e.g., backlights based on quantum dots, backlights that include dichroic filters, etc.). The example of FIG. 7 is merely illustrative.

Figure 8:
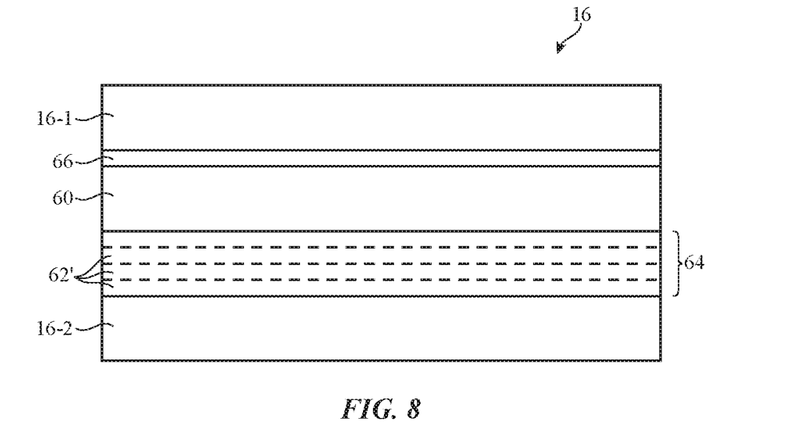
FIG. 8 is a cross-sectional side view of an illustrative window with a thin-film interference filter in accordance with an embodiment.
Figure 9:
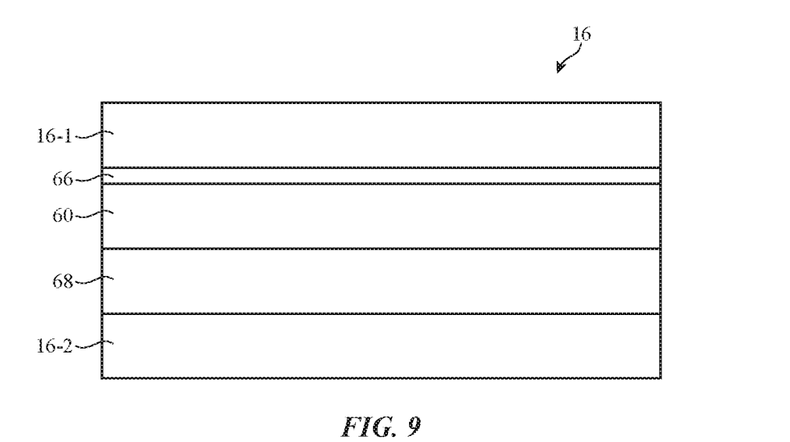
FIG. 9 is a cross-sectional side view of an illustrative window with a filter based on light-absorbing substances such as light-absorbing dyes in accordance with an embodiment.

Illustrative windows with light filter layers having stop bands such as stop bands SBB, SBG, and SBR are shown in FIGS. 8 and 9. As shown in FIG. 8, window 16 may have an outer structural window layer such as layer 16-1 and an inner structural window layer such as layer 16-2. Layers 16-1 and 16-2 may be formed from transparent glass, clear plastic, or other substrate materials. A polymer layer (e.g., a PVB or EVA layer) such as layer 60 may be interposed between layers 16-1 and 16-2 and may adhere layers 16-1 and 16-2 together. An optional partially reflective mirror such as partially reflective mirror 66 may be formed on one of the surfaces of layer 16-1 and/or layer 16-2. Partially reflective mirror 66 may be formed from a thin metal coating layer on the inner surface of outer layer 16-1 or may be formed from other partially reflective mirror structures. In bright daylight conditions, exterior 24 will be brighter than interior 20 and the presence of partially reflective mirror 66 will reflect the bright exterior light towards observer 34. This reflected bright light may overwhelm any interior light from display 26 and/or light source 32, thereby ensuring daytime privacy for occupant 18.

Privacy for occupant 18 in dim exterior lighting conditions may be provided by incorporating light filter 64 into window 16. Filter 64 may be configured to exhibit stop bands such as stop bands SBB, SBG, and SBR. In the example of FIG. 8, filter 64 has been formed from multiple thin-film dielectric layers (i.e., filter 64 is a thin-film interference filter and may sometimes be referred to as a dichroic filter). The thin-film layers may be, for example, inorganic dielectric layers such as layers of silicon dioxide, silicon nitride, metal oxides, nitrides, other inorganic dielectric layers and/or organic dielectric layers (e.g., polymer layers). The thin-film layers of filter layer 64 may have alternating refractive index values (e.g., higher refractive index layers may be alternated with lower refractive index values) and/or thin-film stacks with other patterns of two or more, three or more, or four or more different dielectrics with different respective refractive index values may be used to provide filter 64 with desired stop bands. Filter 64 may be formed from thin-film coating layers on the inner surface of inner layer 16-2 or may be formed elsewhere in window 16.

In the example of FIG. 9, filter layer 68 has been formed from a polymer layer or other layer of material that contains light-absorbing substances (dyes, plasmonic nanoparticles, etc.). These light-absorbing substances may create light absorption peaks (transmission stop bands) aligned with the narrowband red, green, and blue light (R, G, and B) from interior 20 (e.g., narrowband light from light source 32 and/or from display 26). As an example, filter layer 68 may be formed form a polymer layer that contains a blue-light-absorbing dye or other substance that forms blue stop band SBB, a green-light-absorbing dye or other substance that forms green stop band SBG, and a red-light-absorbing dye or other substance that forms red stop band SBR. Window 16 of FIG. 9 may have an optional partially reflective mirror such as mirror 66 on the inner surface of outer layer 16-1.

Figure 10:
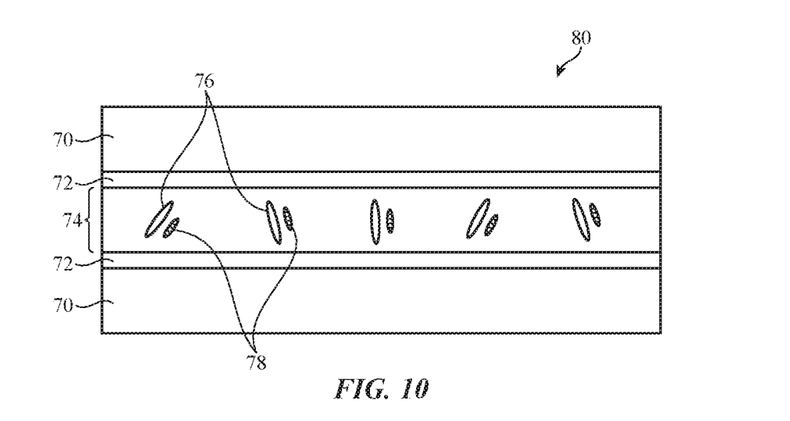
FIG. 10 is a cross-sectional side view of an illustrative guest-host liquid crystal device of the type that may serve as an adjustable filter layer for a window in accordance with an embodiment.

If desired, an adjustable light filter may be formed using a guest-host liquid crystal device of the type shown in FIG. 10. Adjustable filter 80 may be formed from a liquid crystal layer (layer 74) sandwiched between substrate layers 70. Layers 70 may be formed from structural window layers such as layers 16-1 and/or 16-2 and/or may be additional layers that are incorporated into window 16 (e.g., in polymer layer 60). Electrodes 72 may be formed from transparent conductive layers (e.g., indium tin oxide layers, etc.) on the inner surfaces of layers 70. A drive signal (e.g., an alternating current signal) may be applied across layer 74 using electrodes 72. The drive signal may be varied by control circuitry 42 to vary the orientation of liquid crystal host molecules 76 in layer 74. Guest molecules 78 may be colored dyes (e.g., green, blue, and red dyes) with anisotropic light absorption properties. When the molecules of the colored dyes are oriented to maximize light absorption for light passing through window 16, the anisotropic dyes may exhibit light absorption peaks (stop bands) at respective green, blue, and red wavelengths. In other dye molecule orientations, the light absorption peaks will not be present.

The orientation of guest molecules 78 and therefore the absorption of light at the stop bands associated with the colored dyes can be controlled by controlling the orientation of liquid crystal molecules 76. When it is desired to make window 16 completely transparent (i.e., when it is desired for adjustable filter 80 to exhibit no stop bands because privacy is not desired), control circuitry 42 can set the drive signal applied to layer 74 with electrodes 72 to a first drive signal level. In this situation, liquid crystal molecules 76 and therefore guest molecules 78 are not aligned in a direction that enhances light absorption from molecules 78. Because molecules 78 are not oriented in a direction that enhances light absorption from molecules 78, all wavelengths of light from interior 20 may pass through window 16.

When it is desired to adjust filter 80 to create stop bands to block narrowband light from interior 20 (e.g., red light R, green light G, and blue light B), a drive signal with a second level may be applied to layer 74 with electrodes 72. When driven at this second level, liquid crystal molecules 76 and therefore dye molecules 78 will align in a direction that gives rise to light absorption peaks from the dye molecules 78. In this situation, filter 80 may exhibit a transmission spectrum with stop bands such as spectrum 54 of FIG. 5. Intermediate drive signal levels may be applied to selectively reduce the amount of privacy light filtering that is applied.

By supplying one or more windows in a vehicle or other system with adjustable filters such as adjustable filter 80, control circuitry 42 may be directed to render some windows (e.g., a driver's side window that includes adjustable filter 80) transparent while blocking interior light (e.g., at wavelengths R, G, and B) from passing through other windows. If desired, a driver's side window or other window in system 10 may be provided with filter 80 while other windows in system 10 may be provided with non-adjustable filters (e.g., non-adjustable filters such as thin-film interference filter 64 of FIG. 8 or absorptive filter 68 of FIG. 9).

The foregoing is merely illustrative and various modifications can be made to the described embodiments. The foregoing embodiments may be implemented individually or in any combination.

What is claimed is:

1. A system, comprising:
control circuitry;
a support structure;
a window supported by the support structure, wherein the window and support structure enclose an interior region and separate the interior region from an exterior region and wherein the window includes a light filter with visible light stop bands; and
a light source in the interior region, wherein the control circuitry is configured to adjust the light source to produce a selected one of:
broad spectrum visible light including light at visible wavelengths that are not blocked by the visible light stop bands; and
narrowband light that is blocked by the visible light stop bands.

2. The system defined in claim 1 wherein the light source includes narrowband bandpass filters that filter white light to produce the narrowband light.

3. The system defined in claim 1, wherein the light source comprises a display with a pixel array that displays images.

4. The system defined in claim 1, wherein the light source comprises an ambient light source in the interior region.

5. The system defined in claim 1, wherein the window comprises an inner glass layer and an outer glass layer, the light filter being interposed between the inner glass layer and the outer glass layer.

6. The system defined in claim 1 wherein the light source comprises a non-light-emitting-diode white light source that produces the broad spectrum visible light.

7. The system defined in claim 6 wherein the non-light-emitting diode white light source comprises an incandescent lamp.

8. The system defined in claim 1, wherein the system comprises a vehicle.

9. The system defined in claim 8, wherein the support structure comprises a vehicle body for the vehicle.

10. The system defined in claim 1, wherein the visible light stop bands include at least first, second, and third stop bands.

11. The system defined in claim 10, wherein the first, second, and third stop bands are each characterized by a bandwidth of 5-25 nm.

12. The system defined in claim 1 wherein the light source comprises narrowband light-emitting diodes that produce the narrowband light and a white light-emitting diode that produces the broad spectrum visible light.

13. The system defined in claim 12 wherein the visible light stop bands include at least first, second, and third stop bands having full-width-half-maximum bandwidths of 5-25 nm.

14. The system defined in claim 13 wherein the narrowband light-emitting diodes include at least first, second, and third light-emitting diodes that respectively produce respective narrowband light that is blocked by the first, second, and third stop bands.

15. The system defined in claim 14 wherein the first light-emitting diode produces blue light, the second light-emitting diode produces green light, and the third light-emitting diode produces red light.

16. The system defined in claim 15 wherein the blue light has a full width half maximum bandwidth of 5-25 nm, wherein the green light has a full width half maximum bandwidth of 5-25 nm, and wherein the red light has a full width half maximum bandwidth of 5-25 nm.

17. The system defined in claim 16 wherein the white light-emitting diode comprises a photoluminescent material and a light-emitting diode that produces light that stimulates the photoluminescent material.

18. The system defined in claim 17 wherein the light filter comprises a thin-film interference filter.

19. The system defined in claim 18 wherein the window includes at least one structural window layer and wherein the thin-film interference filter comprises a dielectric stack of coating layers on the structural window layer.

20. The system defined in claim 18 wherein the window includes an outer glass layer, an inner glass layer, and a polymer layer interposed between the outer and inner glass layers and wherein the thin-film interference filter is between the outer and inner glass layers.

21. The system defined in claim 17 wherein the light filter comprises dyes.

22. The system defined in claim 21 wherein the dyes comprise first, second, and third dyes having first, second, and third light absorption peaks that respectively form the first, second, and third stop bands.

23. The system defined in claim 22 wherein the light filter comprises an adjustable guest-host liquid crystal light filter and wherein the first, second, and third dyes exhibit anisotropic light absorption.

* * * * *